US009292834B2

(12) United States Patent
Patel et al.

(10) Patent No.: US 9,292,834 B2
(45) Date of Patent: Mar. 22, 2016

(54) MESSAGING SYSTEM WITH CONTENT-BASED DYNAMIC MENU GENERATION

(75) Inventors: Labhesh Patel, San Francisco, CA (US); Sanjeev Kumar, San Francisco, CA (US); Mukul Jain, San Jose, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 922 days.

(21) Appl. No.: 11/346,410

(22) Filed: Feb. 2, 2006

(65) Prior Publication Data

US 2007/0180060 A1    Aug. 2, 2007

(51) Int. Cl.
*G06Q 10/10*      (2012.01)
*H04L 12/58*      (2006.01)
*H04M 3/533*      (2006.01)

(52) U.S. Cl.
CPC .............. *G06Q 10/107* (2013.01); *H04L 51/36* (2013.01); *H04M 3/53333* (2013.01); *H04L 51/066* (2013.01); *H04M 2203/355* (2013.01); *H04M 2203/4509* (2013.01)

(58) Field of Classification Search
CPC ..... H04L 12/589; H04L 51/36; H04L 51/066; G06Q 10/107; H04M 2203/355; H04M 2203/4509; H04M 3/53333
USPC ........................................................ 709/206
See application file for complete search history.

(56) References Cited

U.S. PATENT DOCUMENTS

| 5,729,687 | A | 3/1998 | Rothrock et al. |
| 6,009,519 | A | 12/1999 | Jones et al. |
| 6,014,427 | A | 1/2000 | Hanson et al. |
| 6,236,854 | B1 | 5/2001 | Bradshaw, Jr. |
| 6,259,405 | B1 | 7/2001 | Stewart et al. |
| 6,342,903 | B1 | 1/2002 | Fado et al. |
| 6,438,215 | B1 * | 8/2002 | Skladman et al. ........... 379/67.1 |
| 6,501,739 | B1 | 12/2002 | Cohen |
| 6,507,643 | B1 * | 1/2003 | Groner .................. H04L 51/066 379/88.14 |
| 6,545,596 | B1 | 4/2003 | Moon |
| 6,590,604 | B1 | 7/2003 | Tucker et al. |
| 6,608,820 | B1 | 8/2003 | Bradshaw, Jr. |
| 6,671,262 | B1 | 12/2003 | Kung et al. |

(Continued)

FOREIGN PATENT DOCUMENTS

EP           0999685 A2     11/1999
WO    WO 2004/095814    11/2004

OTHER PUBLICATIONS

Extended European Search Report; Application No. 06844501.4-1862; dtd May 7, 2013; 7pages.

*Primary Examiner* — Joe Chacko
(74) *Attorney, Agent, or Firm* — Baker Botts L.L.P.

(57) ABSTRACT

A unified messaging system for an enterprise includes a messaging module operable to store a message sent by a first user to a second user in a first media type, and to deliver the message to the second user in either the first type or a second media type. A natural language speech parsing (NLSP) module coupled with the messaging module is operable to detect an actionable item contained within the message, the messaging module dynamically modifying a response menu to include an option corresponding to the actionable item, and then presenting the modified response menu to the second user concurrent with or following delivery of the message. It is submitted with the understanding that it will not be used to interpret or limit the scope or meaning of the claims.

15 Claims, 4 Drawing Sheets

(56) References Cited

U.S. PATENT DOCUMENTS

| | | |
|---|---|---|
| 6,778,642 B1 * | 8/2004 | Schmidt et al. ............ 379/88.13 |
| 6,816,469 B1 | 11/2004 | Kung et al. |
| 6,865,540 B1 | 3/2005 | Faber et al. |
| 6,876,734 B1 | 4/2005 | Summers et al. |
| 6,885,900 B1 | 4/2005 | Rybicki et al. |
| 6,905,414 B2 | 6/2005 | Danieli et al. |
| 6,907,112 B1 * | 6/2005 | Guedalia et al. .......... 379/88.17 |
| 6,909,778 B2 | 6/2005 | Wengrovitz |
| 6,931,001 B2 | 8/2005 | Deng |
| 6,931,113 B2 | 8/2005 | Ortel |
| 6,985,745 B2 | 1/2006 | Quaid |
| 6,987,744 B2 | 1/2006 | Harrington et al. |
| 7,801,968 B2 * | 9/2010 | Wang ..................... H04L 12/58 709/206 |
| 2002/0098831 A1 * | 7/2002 | Castell et al. ................. 455/413 |
| 2002/0196910 A1 * | 12/2002 | Horvath et al. ........... 379/88.01 |
| 2003/0021404 A1 * | 1/2003 | Wengrovitz .................. 379/219 |
| 2003/0063732 A1 * | 4/2003 | Mcknight ................ 379/210.01 |
| 2003/0165231 A1 * | 9/2003 | Singh et al. .............. 379/265.09 |
| 2004/0162747 A1 | 8/2004 | Yeh et al. |
| 2004/0234046 A1 | 11/2004 | Skladman et al. |
| 2005/0135383 A1 * | 6/2005 | Shenefiel ................. 370/395.52 |
| 2005/0157708 A1 | 7/2005 | Chun |
| 2005/0177622 A1 * | 8/2005 | Spielman et al. ............ 709/206 |
| 2005/0210112 A1 | 9/2005 | Clement et al. |
| 2005/0262208 A1 | 11/2005 | Haviv et al. |
| 2006/0148457 A1 * | 7/2006 | Borella ........................ 455/415 |

* cited by examiner

MESSAGING SYSTEM WITH CONTENT-BASED DYNAMIC MENU GENERATION

FIELD OF THE INVENTION

The present invention relates generally to the fields of data networks and communication systems; more specifically, to messaging systems and methods for delivery and retrieval of electronic messages transmitted over a telephony network.

BACKGROUND OF THE INVENTION

Voice messaging systems that enable users to send and retrieve voice mail messages are known in the communication arts. In a typical prior art voice messaging system a telephone is connected to a private branch exchange (PBX) that may utilize a notification mechanism, such as a message waiting indicator light, to notify a message recipient that a new message is waiting for them. Many wireless telephone communication systems also provide a Short Message Services (SMS) feature that allows users to send and/or receive short text messages. Most of the current generation digital cell phones sold today can receive and send SMS messages. Cellular telephone systems that provide SMS usually include a messaging server for receiving notification messages from a source (e.g., a voice mail, electronic mail, or paging system) in accordance with the Short Message Peer-to-Peer Protocol (SMPP).

Many modern communication systems provide messaging services via packet-based networks, i.e., those that operate in accordance with the ubiquitous Internet Protocol (IP). By way of example, U.S. Patent Publication No. 2005/0135383 discloses an arrangement for accessing messages in an Internet Message Access Protocol (IMAP) message store via telephone using a web-based voice message system (VMS) as an email client for the IMAP message store. The VMS includes an application server and a browser configured for generating an audio file that stores received voice signals specifying a message operation. U.S. Patent Publication No. 2005/0210112 teaches a system and method for allowing a sender to use a generic message entry form via an electronic mail (email) service or an instant messaging service over an Internet-connected computer.

A unified messaging system (UMS), such as the commercially-available Cisco® Unity integrated system, handles voice, facsimile and regular text messages as objects in a single mailbox that a user can access either with a regular email client, or by telephone. A UMS typically connects to a PBX to provide automated attendant, audiotext, and voice mail services to subscribers or users. For instance, a personal computer (PC) user with multimedia capabilities typically can open and playback voice messages, either as speech or text. Unified messaging is thus particularly convenient for mobile business users because it allows them to reach colleagues and customers through a PC or telephone device, whichever happens to be available.

An example of a unified messaging system is found in U.S. Patent Publication No. 2005/0177622, which teaches a scalable UMS that outputs a notification delivery message according to a prescribed open protocol based, in part, on a subscriber's notification preference. U.S. Patent Publication No. 2005/0157708 teaches a system and method providing UMS services that includes a public switched telephone network (PSTN) interface for a telephone network service, a VMS, a facsimile, and an IP interface for connection to a packet-based network for an Internet messaging (e.g., an email) service.

Unified messaging systems generally have menu options that are fixed regardless of the message content. For example, after listening to an email message a user may be provided with a set of standard menu options, e.g., forward the email, reply to the email, delete the email, etc. Similarly, after listening to a voicemail message a user may have the option of saving the message, deleting the message, forwarding it to another number, etc.

One problem with existing unified messaging and telephony systems is that the standard menu options do not accommodate or facilitate actions that the user (e.g., listener) may want to take based upon information communicated to the user in the message content. For instance, a user may want to call a phone number provided in an email or voicemail message. Likewise, a user may want to send a new message to an email address mentioned in a received email or voicemail message. Frequently, a user listening to a message is burdened with the task of jotting down notes, memorizing information, or replaying the message again and again, in order to take later action based upon information contained within the message.

What is needed then is a messaging system that is capable of detecting certain information items (e.g., telephone numbers, email addresses, etc.) present in the content of a voice or text message, and then dynamically adding action options to a response menu, thereby enabling a user to easily take a corresponding action immediately after listening to the message.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A messaging/telephony system and method that provides content-based dynamic menu generation is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a unified messaging system and method is provided that parses an email or voicemail message for any actionable items. A natural language semantic parser or automated speech recognition (ASR) unit or module may be utilized to identify actionable items in the message, as well as to determine the context in which the actionable items arise. Actionable items may comprise a broad range of actions or items, including, without limitation, a telephone number, an email address, a uniform resource locator (URL) of a document on the World Wide Web (www), or pre-defined items such as one or more specific words (e.g., verbs such as "copy", "schedule", etc.) or alphanumeric character strings. Standard template matching techniques may be utilized for recognizing various actionable item types such as phone numbers, email addresses, Uniform Resource Locator (URL) links, etc.

Each actionable item typically has one or more actions associated with it that the system can perform based on the actionable item type. For example, in the case of an actionable item of type="phone number" (i.e., a phone number detected or identified in the message), the messaging system may provide the user with several options, such as immediately dialing the number provided in the message, sending a SMS reply message to that number, or scheduling a call to that number at a later time. Similarly, in the case of an actionable item of type="email address" (i.e., an electronic mail address detected or identified in the message) the messaging system may offer the user with the option of composing and sending a reply email message to that address.

Each of these options may be offered to the user in the form of response menu options dynamically generated and added to a standard list of menu options. The menu options may be provided as part or a graphical user interface (GUI), touch user interface (TUI), or voice user interface (VUI) associated with an IVR. These interfaces (GUI/TUI/VUI) may run on a wide variety of communication devices, including a personal computer (PC), a personal digital assistant (PDA), a telephone device, a pager, etc.

Figure 1:
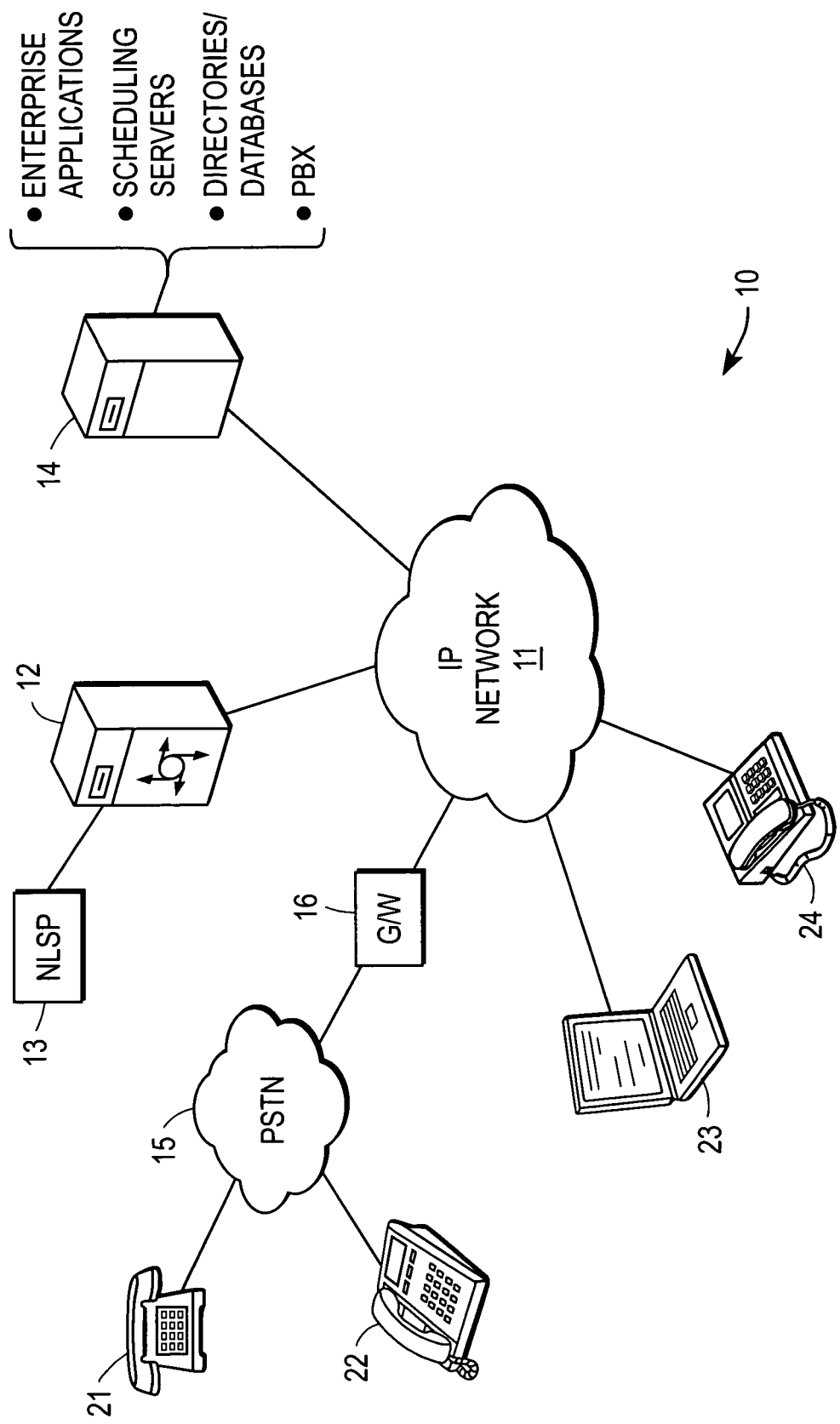
FIG. 1 is a conceptual block diagram of a messaging system in accordance with one embodiment of the present invention.

Referring to FIG. 1, an architectural drawing of an exemplary messaging system 10 in accordance with one embodiment of the present invention is shown including a unified messaging box or module 12 (e.g., comprising an application or code running on a server) coupled with an action server 14 via IP network 11. Action server 14 executes actions selected or confirmed by users in response to one or more menu options generated based on actionable items detected in the message delivered to a user. The action(s) associated with the actionable item may necessarily require action server 14 to access different applications, databases and/or other corporate resources. For example, these may include enterprise applications, scheduling servers, corporate directories/databases, and PBX systems. In certain cases, action server 14 may require certain action parameters and/or authentication information before executing a particular action on behalf of a user.

Individual users may retrieve messages stored in module 12 (and take responsive actions thereto) through a variety of different devices and communication paths. For example, a user calling into module 12 from either a voice-only telephone 21 or a conventional office telephone 22 with a text message screen may connect with module 12 via a communication path that includes PSTN 15, Internet gateway device 16, and IP network 11. Users who have access to a PC 23 or voice-over-IP (VoIP) phone 24 may retrieve messages and initiate responsive actions via IP network 11.

Module 12 may incorporate or be associated with a text-to-speech (TTS) converter for converting a text message to audible speech when a user connects with module 12 via a voice-only device. Similarly, module 12 may incorporate or be associated with a speech-to-text (STT) converter for converting a voice message to text for a user connected via a display-only device. Conversions from different media formats or types (e.g., speech-to-text or text-to-speech) may also be based on user preferences rather than the user interface capabilities of the dialing user's device.

The embodiment of FIG. 1 also includes a natural language semantic parser module 13, which is shown coupled with unified messaging module 12. NLSP 13 may comprise known systems and programs, such as SRI International's Gemini™ system, that apply a set of syntactic and semantic grammar rules to a word strings to generate a logical form, which is a structured representation of the meaning of the string. In conjunction with unified message module 12, NLSP 13 provides system 10 with the ability to identify the context surrounding an actionable item contained in a voice or email message, thereby providing some or all of the parameters required for a particular responsive action.

Figure 3:
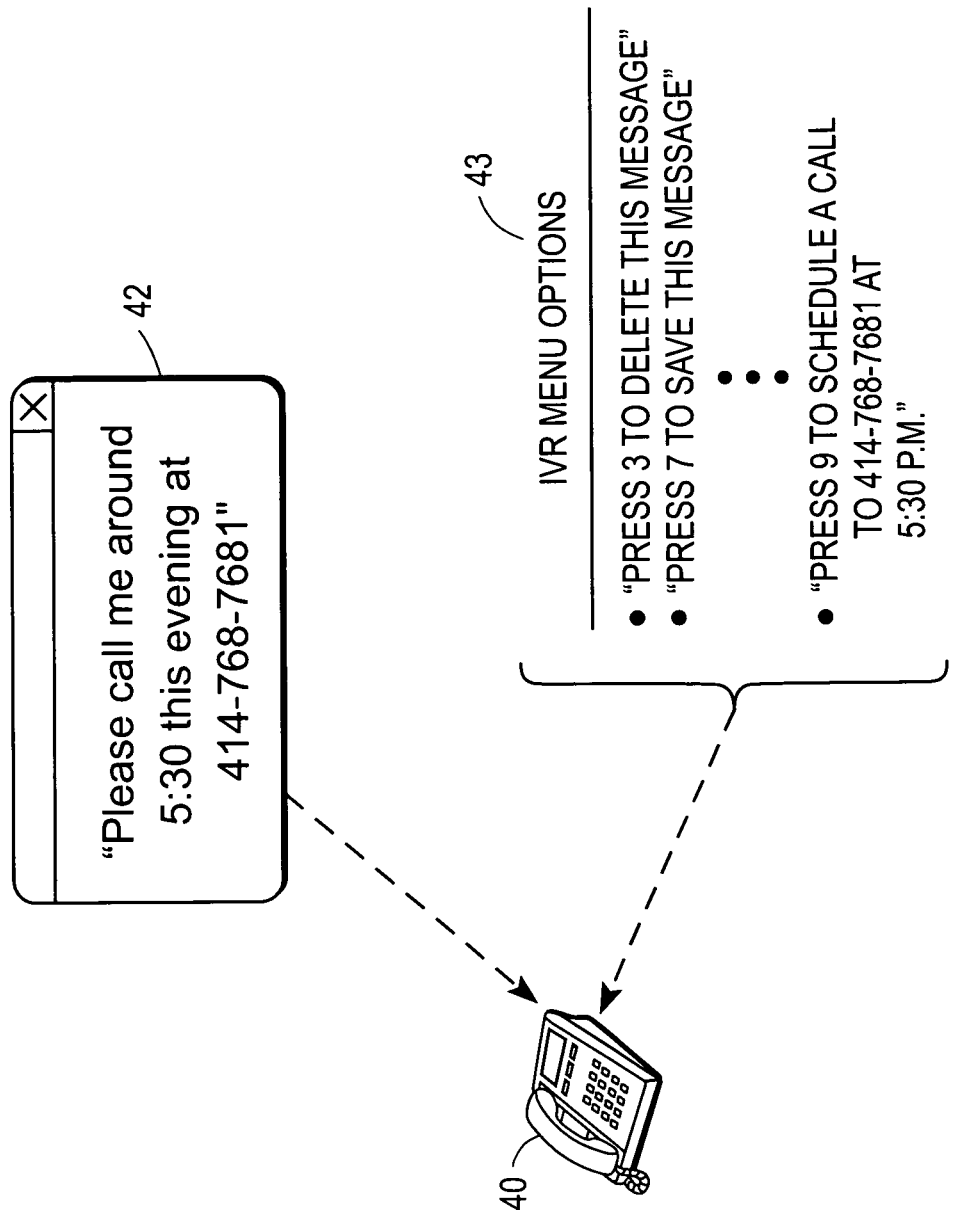
FIG. 3 illustrates an example of dynamic menu generation in accordance with one embodiment of the present invention.

By way of example, FIG. 3 illustrates one scenario enabled by the embodiment of FIG. 1 in which a user listens to an email message received in his mailbox (shown by user interface window 42) using a telephone device 40. In this case the message is played out to the user by unified messaging module 12 as audible speech, which says, "Please call me around 5:30 this evening at 414-768-7681". Module 12, in conjunction with NLSP 13, functions to parse the message and detect the presence of a telephone number in the message along with the request to call that number at a specified time. In other words, natural language parsing examines the context surrounding the telephone number and interprets the message so as to be able to identify when to schedule the call. Module 12 then dynamically modifies a list of IVR menu options 43 accordingly. When the user has finished listening to the message, the system prompts the user with an additional menu item that says, "Press #9 to schedule a call to 414-768-7681 at 5:30 p.m." If the user selects this option, module 12 instructs action server 14 to execute the action item (i.e., schedule the call to the number at the indicated time using the proper channels and enterprise resources).

Note that the user not only hears the standard menu options such as "Delete this message", "Save this message", etc., but also the additional menu options that provide actions associated with each actionable item detected in that message.

It should be understood that modification of the list of menu options 43 can take many different forms, depending on preferences and system configurations and requirements. For instance, a system configured with an ASR module may add an option that simply relies upon voice instructions, i.e., "Should I schedule a call to 414-768-6781 at 5:30?" In another embodiment, a user may input his personal preferences into module 12, resulting in an alternative set or series of optional responses or menu options (e.g., "Should I send a SMS to 414-768-7681?").

In still another embodiment, the unified messaging system may lead the user through a form filling phase where it solicits input from the user in order to obtain missing parameters required to execute an action. For instance, if the actionable item is a telephone number (e.g., 414-768-7681), and there is no callback time context detected in the message, the user may select the menu option scheduling a call to 414-768-7681. Thereafter, the system may prompt the user for a time to schedule the call. That is, a next menu inquiry might ask, "When would you like to schedule the call?" And so on. After the system has finished obtaining the necessary information from the user, action server 14 operates to execute the action.

For example, in one embodiment, module 12 and action server 14 may be integrated with a user's schedule manager or calendar application for actions that require scheduling. In the case where an actionable item suggests scheduling a telephone call at a specified time, action server 14 may operate to access the user's schedule manager to determine if the action presents a scheduling conflict; if so, the system may send back a warning (e.g., "You have a scheduling conflict at 5:30 p.m. Do you want to schedule the call at that time anyway?") to the user before scheduling that call. On the other hand, if there is no scheduling conflict the system may automatically dial the number at the scheduled time and connect the call to the user's telephone device.

In general, the unified messaging system 10 of FIG. 1 operates to dynamically add menu options based on the content of the message (including the surrounding context), and then present these menu options to the user through an appropriate user interface. The appropriate user interface can be detected based on presence information obtained from the calling device, and/or based on user preferences. In the example of FIG. 3, a VUI is the appropriate user interface for telephone device 40. In the case of a VoIP phone, the user may prefer to receive the menu options as text displayed on the phone's display screen with responses being activated via programmed softkey buttons (e.g., "yes", "no", etc.). A user retrieving his messages using a PC may prefer a GUI for listing and responding to the menu options.

Practitioners in the art will appreciate that any or all of the component elements shown in FIG. 1 may be coupled or connected in a variety of different architectural configurations. That is, the component elements depicted by way of example in the drawing of FIG. 1 may be connected through a corporate intranet, some other type of network, or physically connected directly to one another. For instance, in an alternative embodiment unified messaging module 12 may be connected with action server 14 either directly or through a corporate intranet network instead of via IP network 11. Conversely, rather than being coupled together as shown in FIG. 1, unified messaging module 12 and NLSP 13 may be connected via IP network 11 or some other network connection.

Additionally, it should be understood that each of the component modules and units shown in FIG. 1 may be implemented by hardware, firmware, or software component elements that implement the various functions described herein. In a specific embodiment, the unified messaging system of the present invention may be implemented by software or hardware (firmware) installed in an IP communications system that includes components such as Cisco System's Unity, IP Communicator, Call Manager, MeetingPlace, and other IP messaging/communication products. Alternative embodiments of the present invention may be implemented in PBX, telephony, messaging, and other telecommunications systems.

Figure 2:
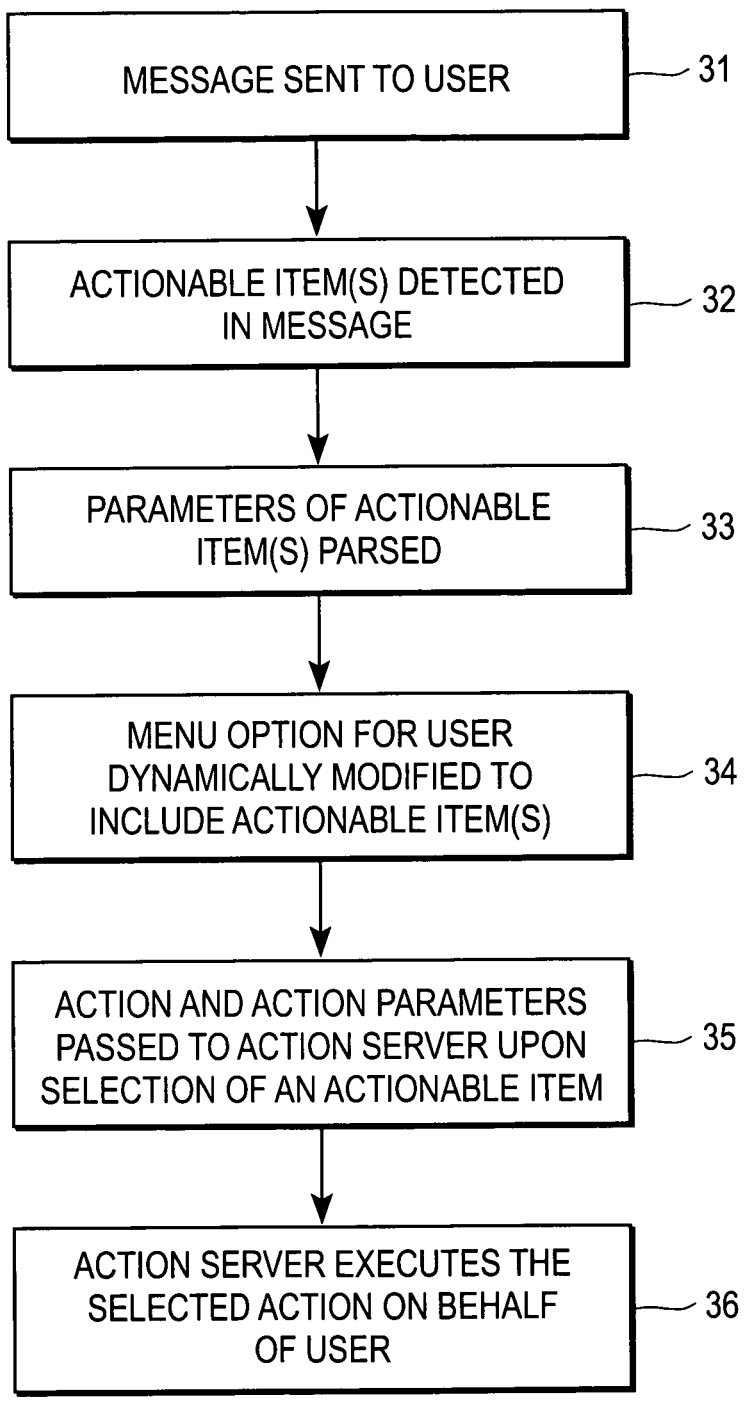
FIG. 2 is a flowchart diagram that illustrates a method of operation according to one embodiment of the present invention.

FIG. 2 is a flowchart diagram that illustrates a general method of operation according to one embodiment of the present invention. The process starts (block 31), after a message has been sent to a user. Either prior to or upon retrieval of the message by the user, the unified messaging system examines the message to detect any actionable items (block 32). Detection of actionable items may involve attempts to match various templates or patterns (e.g., phone numbers, email addresses, "copy <ITEM>", etc.) against the content of the message. In certain embodiments, users and system administrators may define their own actionable items and associated actions.

In the event that one or more actionable items have been detected, the surrounding context of each actionable item may also be analyzed or parsed to identify any parameters associated with each actionable item (block 33). As previously mentioned, if the system is unable to instantiate a parameter, it may prompt the user to input the parameter. Once the system has detected an actionable item and its associated action parameters, a menu option list for presentation to the user is dynamically modified or changed to include one or more additional options specific to the actionable item (block 34). It is appreciated that in certain cases the process of modifying the list of menu options may be intertwined with the process of soliciting parameter input from the user. In other words, the menu options presented to the user may be progressively modified depending upon message content (i.e., whether all required parameters are instantiated) and the user's selections/responses. After the user has selected a particular action (or actions) from the available menu options, the action and the corresponding action parameters are passed to the action server (block 35) for execution thereby on behalf of the user (block 36).

After the action has been executed, the action server may optionally sent a message back to the user (message recipient) notifying the user that the action has been taken and been completed. The message may take the form or a normal email or voicemail message.

Figure 4:
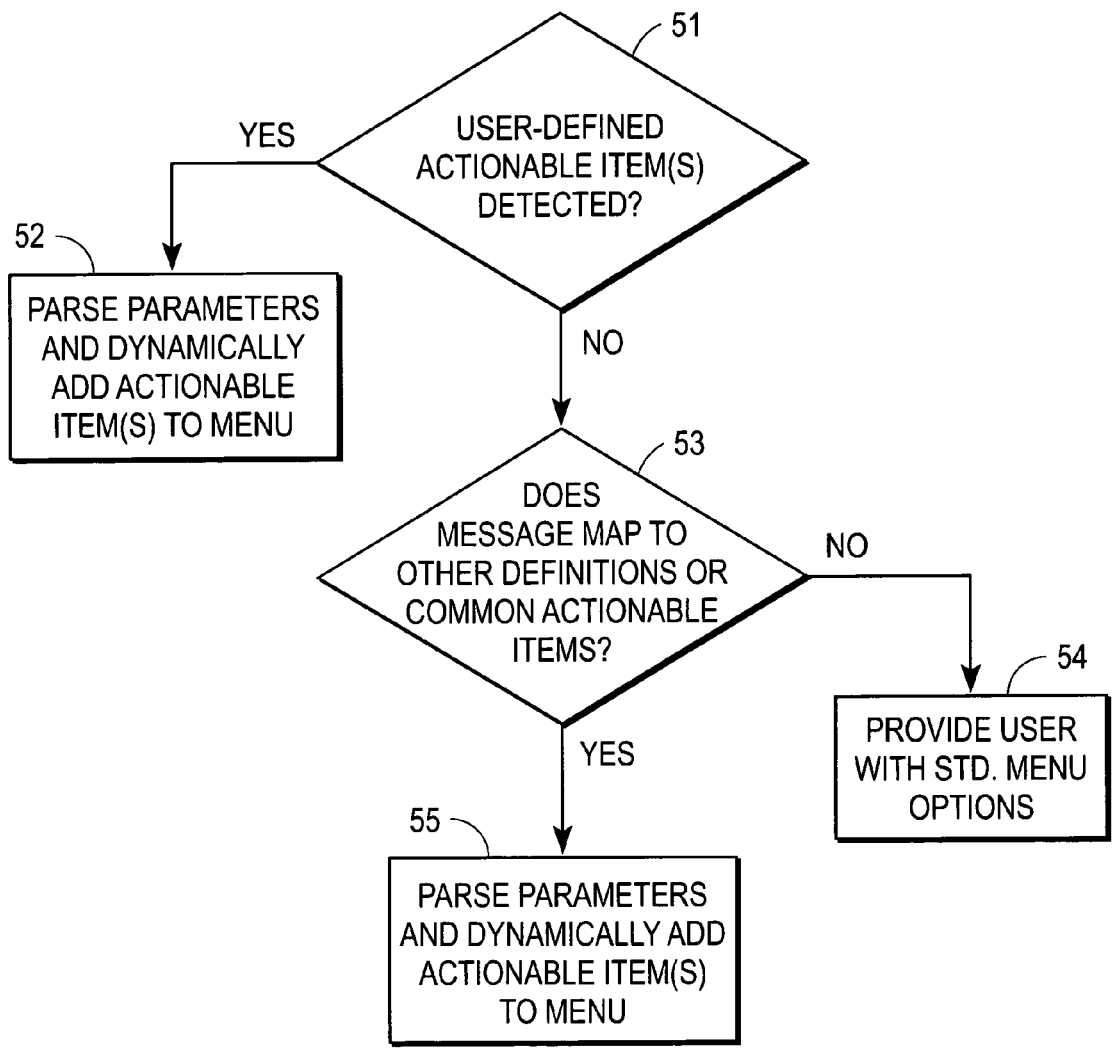
FIG. 4 is a flowchart diagram that illustrates a decision algorithm in accordance with another embodiment of the present invention.

FIG. 4 is a flowchart diagram that illustrates an embodiment of the present invention in which a unified messaging system operates in response to user-defined actionable items and their associated actions, rather than just those defined by a system administrator or programmed into the system. Such user-defined actionable items may accessed by, or input into, a software (or firmware) program running on a processor of module 12 of the system shown in FIG. 1. By way of example, a user may define an actionable item "copy" that matches the pattern "copy <ITEM> from <SOURCE> to <DESTINATION>". When a user receives an email message that reads, "Please copy the data files from /share/data on ccm1 to the data folder on your machine", the system first detects this as a user-defined actionable item (block 51), and then parses the parameters for the copy action (e.g., source folder, source machine, destination folder, destination machine). Thereafter, the system dynamically adds the "copy" actionable item to the response menu option list for this message (block 52).

In the embodiment of FIG. 4, when no user or administratively defined actionable items are detected the system may continue by mapping preferences of other users or a list of common actionable items onto the message (block 53). In other words, detection of actionable items is not limited to statically created listings of actionable items or definitions specific to a particular user; rather, mapping of actionable items may extend to actionable items that the system has learned are most common, i.e., based on other user's experiences, definitions, or history. Essentially, actionable items defined by other users may be shared such that the system learns from the customization and/or activity of a group of users.

Continuing with the example of FIG. 4, in the event that a match is detected based on other definitions or common actionable items, parsing and dynamic addition to the menu takes place in the same manner described above (block 55). Conversely, in the event that no actionable items of any type are detected, the user is provided with a list of standard menu options (block 54).

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred from a remote computer (e.g., a server) to requesting computer (e.g., a customer or client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-readable memory encoded with a computer program for unified messaging operable to:
    store a voicemail or email message sent by a sender to a recipient;
    deliver the voicemail or email message to the recipient;
    detect that a telephone number and a call back time for the telephone number is mentioned by the sender in the voicemail or email message and the identity of the telephone number and call back time by parsing the voicemail or email message with a natural language semantic parser module or by using an automatic speech recognition module;
    prompt the recipient to have a call scheduled to the telephone number mentioned in the voicemail or email message at the call back time mentioned in the voicemail or email message; and;
    schedule the call to the telephone number in response to an indication from the recipient that the call should be scheduled.

2. The computer-readable memory of claim 1 wherein the prompt is presented to the recipient as audible speech.

3. The computer-readable memory of claim 1 further operable to determine a context of the telephone number from the content of the voicemail or email message, and parse one or more action parameters from the context.

4. The computer-readable memory of claim 1 further operable to convert the voicemail message to text, and convert the email message to speech.

5. A computer-readable memory encoded with a computer program for unified messaging operable to:
    store a message sent by a sender to a recipient in a first media type;
    deliver the message to the recipient in either the first media type or a second media type;
    detect that a telephone number and a proposed time for a call is mentioned by the sender in the message and the identity of the telephone number and call back time by parsing the voicemail or email message with a natural language semantic parser module or by using an automatic speech recognition module; and
    access a schedule manager of the recipient and determine availability of the recipient to conduct the call to the telephone number at the proposed time.

6. The computer-readable memory of claim 5 further operable to automatically execute a specific action responsive to selection of the option by the recipient from the response menu.

7. A processor-implemented method for messaging in an enterprise, comprising:
    storing a message sent by a sender addressed to a recipient;
    detecting that a telephone number and a call back time for the telephone number is mentioned by the sender in the message with a natural language semantic parser module or by using an automatic speech recognition module
    prompting the recipient to have a call scheduled to the telephone number mentioned in the voicemail or email message at the call back time mentioned in the voicemail or email message; and;
    scheduling the call to the telephone number in response to an indication from the recipient that the call should be scheduled.

8. The processor-implemented method of claim 7 further comprising notifying the recipient that the specific action has been executed.

9. The processor-implemented method of claim 7 wherein the message comprises an email message or a voicemail message.

10. The processor-implemented method of claim 7 further comprising learning common actionable items based on a history of usage from other users.

11. The processor-implemented method of claim 7 wherein the actionable item is one or more of a telephone number, an email address other than an email address of the recipient or the sender, a uniform resource locator (URL), or a verb.

12. A unified messaging system for an enterprise comprising:
    a first computer-readable memory encoded with a computer program operable to store a message sent by a sender to a recipient in a first media type, and to deliver the message to the recipient in either the first media type or a second media type;
    a second computer-readable memory encoded with a computer program operable to detect that a telephone number and a time for a call is mentioned by the sender in the message; and
    access a schedule manager of the recipient and determine availability of the recipient to conduct the call to the telephone number at the proposed time.

13. The unified messaging system of claim 12 wherein the first media type comprises audible speech and the second media type comprises text.

14. The unified messaging system of claim 12 wherein the first media type comprises text and the second media type comprises audible speech.

15. The unified messaging system of claim 12 wherein the message comprises an email message or a voicemail message.

* * * * *